F. R. COVEY & C. F. HOAG.
SEAT ATTACHMENT FOR MOTOR CYCLES.
APPLICATION FILED JAN. 17, 1911.
1,027,992.
Patented May 28, 1912.
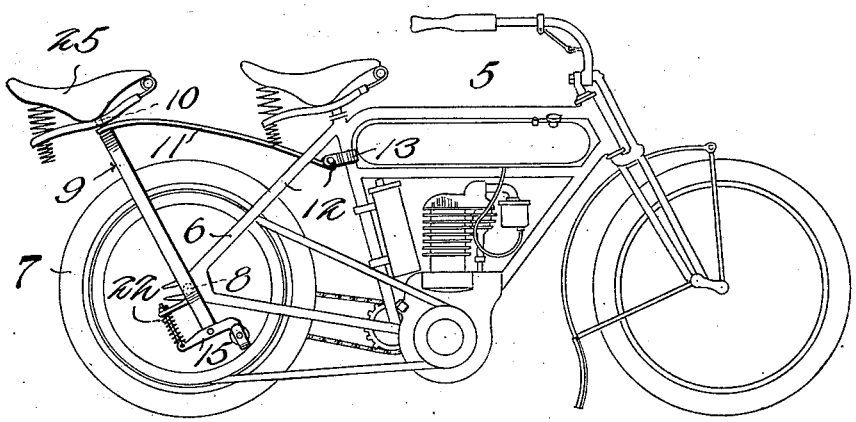
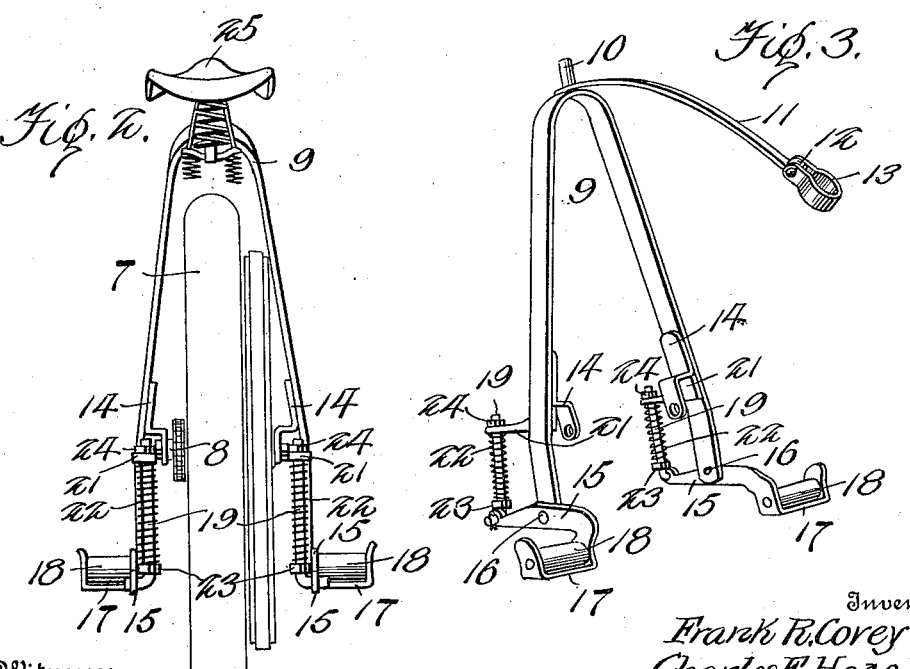
Witnesses
Inventors
Frank R. Corey
Charles F. Hoag
By Victor J. Evans
Attorney
COLUMBIA PLANOGRAPH CO., WASHINGTON, D. C.

UNITED STATES PATENT OFFICE.

FRANK RICHARD COVEY AND CHARLES FRANCES HOAG, OF RIVERSIDE, CALIFORNIA.

SEAT ATTACHMENT FOR MOTOR-CYCLES.

1,027,992.  Specification of Letters Patent.  Patented May 28, 1912.

Application filed January 17, 1911. Serial No. 603,116.

*To all whom it may concern:*

Be it known that we, FRANK R. COVEY and CHARLES FRANCES HOAG, citizens of the United States, residing at Riverside, in the county of Riverside and State of California, have invented new and useful Improvements in Seat Attachments for Motor-Cycles, of which the following is a specification.

The invention relates to a seat attachment for motor cycles or bicycles, and more particularly to the class of tandem attachments for motor cycles, bicycles or the like.

The primary object of the invention is the provision of an attachment of this character in which one or more persons may mount and ride a motor cycle or bicycle, without discomfort or being subjected to jolts or jars incident thereto on the travel of the same.

Another object of the invention is the provision of a device of this character in which a motor cycle, bicycle or the like may be readily and conveniently converted to a tandem, thereby affording seating capacity for several riders upon the same.

A further object of the invention is the provision of an attachment of this character which is easily and quickly mounted upon the frame of a motor cycle or bicycle, whereby the same may be converted into a tandem to enable two riders to be mounted thereon for carriage from one point to another.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a motor cycle with an attachment constructed in accordance with the invention mounted thereon. Fig. 2 is a rear elevation thereof. Fig. 3 is a perspective view of the attachment removed from the cycle.

Similar reference characters indicate corresponding parts throughout the several views of the drawings.

Referring to the drawings by numerals, 5 designates generally the main frame of the motor cycle or bicycle which is of the ordinary well-known construction, and in the rear fork 6 of which is rotatably mounted the rear supporting wheel 7, the latter being journaled on a rear axle 8 which is secured in the rear fork 6 in the usual well-known manner. Connected to the frame and the rear axle 8 is a tandem attachment or supplemental seat support, which will be hereinafter more fully described. This tandem or seat support comprises an inverted fork 9, from the medial portion of which rises a stud or stem 10, to which is swiveled one end of a resilient bracket or arm 11, the opposite end being formed with an upturned perforated ear 12, with which is pivotally connected a split collar or yoke 13, the latter being adapted to embrace the vertical tube or seat post of the main frame 5 of the motor cycle or bicycle. Spaced from the ends of the fork 9 and secured to the inner face thereof are inwardly projecting offset bearing lugs 14, the free ends of which being provided with suitable apertures receiving the rear axle 8, the lugs being connected to the latter by means of the usual nuts carried thereby.

Mounted upon the free ends of the fork 9 are yieldable foot rests, comprising arms 15, the same being connected medially thereto to the fork 9 by means of pivots 16, and these arms are outturned to provide foot stirrups 17 in which are journaled rollers 18, providing treads for the feet of a person mounted upon the tandem attachment.

Pivotally connected to the arms 15 are guide rods 19, the latter being upwardly projected and loosely working through eyes 20 formed on the ends of rearwardly extending brackets 21 fixed to the fork 9 contiguous the bearing ears 12. Surrounding these guide rods 19 are coiled expansion springs 22, each having one end working against an adjustable nut 23 threaded on the guide rods 19, while its opposite end bears against the eye 20 of the bracket 21, so as to tension the stirrups and permit the same to yield when pressure is applied thereto by the foot of a person. Threaded on the upper ends of the guide rods 19 are adjustable nuts 24, the latter normally resting against the eyes 20 of the brackets 21, the nuts being adapted to regulate the tension of the springs 22 surrounding the said guide rods, so as to increase or decrease the resistance of the springs when foot pressure is applied to the stirrups.

Mounted upon the stud or stem 10 is a rider's seat 25 of the usual or ordinary type, the same being adapted to be occupied by a rider when mounted upon the attachment. When the rider is occupying the seat, his feet are engaged in the stirrups, thus assuring a comfortable and steady mount upon the attachment.

What is claimed is:

1. An attachment of the class described, comprising an inverted fork having a stem medially thereof, a resilient arm connected with the stem and with the seat post of a bicycle frame, lugs formed on the fork and adapted for engagement with the rear axle of said frame, pivotal stirrups carried at the free ends of the fork, and means for yieldingly holding the stirrups in position on their pivots.

2. An attachment of the class described, comprising a fork, means connecting it with the axle of a motor cycle, means connecting the fork with the frame of such motor cycle, stirrups pivotally connected with the free ends of the fork and having tread rollers, brackets fixed to the fork and projecting rearwardly therefrom, guide rods pivotally connected to the stirrups and working through the brackets, and springs coöperating with the guide rods for tensioning the stirrups.

3. An attachment of the class described, comprising a fork, means connecting it with the axle of a motor cycle, means connecting the fork with the frame of such motor cycle, stirrups pivotally connected with the free ends of the fork and having tread rollers, brackets fixed to the fork and projecting rearwardly therefrom, guide rods pivotally connected to the stirrups and working through the brackets, springs carried by the guide rods and acting upon the stirrups for holding them under tension, and means for regulating the tension of the springs.

In testimony whereof we affix our signatures in presence of two witnesses.

FRANK RICHARD COVEY.
CHARLES FRANCES HOAG.

Witnesses:
E. L. COVEY,
W. E. PALMER.

---

Copies of this patent may be obtained for five cents each, by addressing the "Commissioner of Patents, Washington, D. C."